(12) United States Patent
Oldenburg (10) Patent No.: US 7,108,267 B2
(45) Date of Patent: Sep. 19, 2006

(54) SEAL FOR A SHAFT

(75) Inventor: Michael R. Oldenburg, Madelia, MN (US)

(73) Assignee: International Seal Company, Inc., Shakopee, MN (US)

( * ) Notice: Subject to any disclaimer, the term of this patent is extended or adjusted under 35 U.S.C. 154(b) by 0 days.

(21) Appl. No.: 10/706,443

(22) Filed: Nov. 12, 2003

(65) Prior Publication Data

US 2004/0094899 A1    May 20, 2004

Related U.S. Application Data

(63) Continuation of application No. 09/999,654, filed on Oct. 31, 2001, now Pat. No. 6,692,007.

(51) Int. Cl.
*F16J 15/32*    (2006.01)

(52) U.S. Cl. ............... 277/571; 277/562; 277/371

(58) Field of Classification Search ............ 277/549, 277/562, 571–573, 371
See application file for complete search history.

(56) References Cited

U.S. PATENT DOCUMENTS

| | | | |
|---|---|---|---|
| 3,022,081 A | 2/1962 | Kosatka | |
| 3,086,781 A | 4/1963 | Hudson et al. | |
| 3,114,558 A * | 12/1963 | Rhoads et al. | 277/571 |
| 3,135,518 A | 6/1964 | Carson et al. | |
| 3,275,333 A | 9/1966 | Scott et al. | |
| 3,341,265 A | 9/1967 | Paterson | |
| 3,356,376 A | 12/1967 | Bradfute et al. | |
| 3,606,351 A | 9/1971 | Hallerback | |
| 3,843,139 A | 10/1974 | Messenger | |
| 3,847,453 A | 11/1974 | Herbert | |
| 4,156,531 A | 5/1979 | Boucquey | |
| 4,208,057 A | 6/1980 | Messenger | |
| 4,277,072 A | 7/1981 | Forch | |
| 4,283,063 A | 8/1981 | Prescott | |
| 4,285,526 A | 8/1981 | Klinteberg et al. | |
| 4,418,919 A | 12/1983 | Wentworth | |
| 4,428,586 A | 1/1984 | Romero | |
| 4,432,557 A | 2/1984 | Drucktenhengst | |
| 4,448,426 A | 5/1984 | Jackowski et al. | |
| 4,457,521 A | 7/1984 | Morley | |
| 4,491,332 A | 1/1985 | Zumbusch | |
| 4,497,495 A | 2/1985 | Christiansen | |
| 4,501,431 A | 2/1985 | Peisker et al. | |
| 4,513,976 A | 4/1985 | Bentley et al. | |
| 4,516,783 A | 5/1985 | Mitsue et al. | |
| 4,526,377 A | 7/1985 | Hale et al. | |

(Continued)

FOREIGN PATENT DOCUMENTS

EP    0 036 281 B1    7/1983

(Continued)

*Primary Examiner*—Alison K. Pickard
(74) *Attorney, Agent, or Firm*—Ronald W. Wangerow; Harness, Dickey & Pierce, P.L.C.

(57) ABSTRACT

Unitary radial lip seals are useful to provide permanent lubrication to rotary shaft and bearing assemblies. In addition, these seals also function as excluder seals to keep dirt, chemicals, and other contaminants from contacting the lubricated surfaces. However, previous radial lip seals have a tendency to wear or cut a groove into the associated rotary shaft, as the shaft is rotated during normal operation of the machine. The present disclosure describes a radial lip seal having a sleeve, a seal case, a faceplate and flexible member. This improved seal also has a second sleeve operably positioned between the shaft and the faceplate wiper ring that alleviates the tendency of the wiper ring to cut a groove into the shaft during normal operation of the machine.

51 Claims, 5 Drawing Sheets

U.S. PATENT DOCUMENTS

| | | |
|---|---|---|
| 4,550,920 A | 11/1985 | Matsushima |
| 4,552,367 A | 11/1985 | Fedorovich et al. |
| 4,613,005 A | 9/1986 | Olsson |
| 4,667,968 A | 5/1987 | Nash et al. |
| 4,696,479 A | 9/1987 | Karcher |
| 4,721,312 A | 1/1988 | Hornberger |
| 4,799,808 A | 1/1989 | Otto |
| 4,808,012 A | 2/1989 | Otto |
| 4,819,999 A | 4/1989 | Livesay et al. |
| 4,856,794 A | 8/1989 | Boyers et al. |
| 4,936,433 A | 6/1990 | Kyle |
| 4,943,068 A | 7/1990 | Hatch et al. |
| 5,004,248 A | 4/1991 | Messenger et al. |
| 5,015,001 A | 5/1991 | Jay |
| 5,028,054 A | 7/1991 | Peach |
| 5,042,822 A | 8/1991 | Dreschmann et al. |
| 5,096,207 A | 3/1992 | Seeh et al. |
| 5,183,269 A | 2/1993 | Black et al. |
| 5,201,529 A | 4/1993 | Heinzen |
| 5,209,499 A | 5/1993 | Ruff, Jr. et al. |
| 5,209,502 A | 5/1993 | Savoia |
| 5,211,406 A * | 5/1993 | Katzensteiner ............... 277/351 |
| 5,299,811 A | 4/1994 | Kershaw |
| 5,340,125 A | 8/1994 | Brown et al. |
| 5,348,312 A | 9/1994 | Johnston |
| 5,380,015 A | 1/1995 | Laflin et al. |
| 5,470,157 A | 11/1995 | Dougherty et al. |
| 5,480,161 A | 1/1996 | Borowski |
| 5,503,408 A | 4/1996 | Hermann et al. |
| 5,522,600 A | 6/1996 | Duckwall |
| RE35,309 E | 8/1996 | Matsushima et al. |
| 5,553,870 A | 9/1996 | Czekansky et al. |
| 5,577,741 A | 11/1996 | Sink |
| 5,582,412 A | 12/1996 | Sabo Filho |
| 5,607,168 A | 3/1997 | Dahll |
| 5,655,781 A | 8/1997 | Petrak |
| 5,676,383 A | 10/1997 | Chandler |
| 5,687,972 A | 11/1997 | Petrak |
| 5,716,277 A | 2/1998 | Reynolds |
| 5,836,700 A | 11/1998 | Wilkie, Jr. et al. |
| 5,944,321 A | 8/1999 | Niebling et al. |
| 5,975,538 A | 11/1999 | Krause et al. |
| 6,050,572 A | 4/2000 | Balsells et al. |
| 6,073,933 A | 6/2000 | Johnston |
| 6,149,158 A | 11/2000 | Tripathy |
| 6,168,165 B1 | 1/2001 | Sabo |
| 6,170,833 B1 | 1/2001 | Cox et al. |
| 6,186,507 B1 | 2/2001 | Oldenburg |
| 6,199,869 B1 | 3/2001 | Furuyama et al. |
| 6,220,600 B1 | 4/2001 | Tripathy et al. |
| 6,257,587 B1 | 7/2001 | Toth et al. |
| 6,357,751 B1 | 3/2002 | Rentschler |
| 6,406,026 B1 | 6/2002 | Oldenburg |
| 6,450,503 B1 | 9/2002 | Dossena et al. |

FOREIGN PATENT DOCUMENTS

| | | |
|---|---|---|
| EP | 0 086 002 A1 | 8/1983 |
| EP | 0 091 983 A1 | 10/1983 |
| EP | 0 128 241 A2 | 12/1984 |
| EP | 0 172 348 A1 | 2/1986 |
| EP | 0 213 652 A1 | 3/1987 |
| EP | 0 230 120 A2 | 7/1987 |
| EP | 0 260 441 A2 | 3/1988 |
| EP | 0 172 881 B1 | 9/1988 |
| EP | 0 281 452 A1 | 9/1988 |
| EP | 0 301 731 A2 | 2/1989 |
| EP | 0 303 359 A1 | 2/1989 |
| EP | 0 304 160 A1 | 2/1989 |
| EP | 0 337 893 A1 | 10/1989 |
| EP | 0 385 635 A2 | 9/1990 |
| EP | 0 394 025 A1 | 10/1990 |
| EP | 0 385 635 A3 | 4/1991 |
| EP | 0 420 212 A2 | 4/1991 |
| EP | 0 427 553 A1 | 5/1991 |
| EP | 0 454 193 A1 | 10/1991 |
| EP | 0 474 950 A1 | 3/1992 |
| EP | 0 253 839 B1 | 4/1992 |
| EP | 0 505 793 A1 | 9/1992 |
| EP | 0 420 212 A3 | 12/1992 |
| EP | 0 525 288 A1 | 2/1993 |
| EP | 0 556 494 A1 | 8/1993 |
| EP | 0 562 160 A1 | 9/1993 |
| EP | 0 571 284 A1 | 11/1993 |
| EP | 0 596 196 A2 | 5/1994 |
| EP | 0 611 904 A1 | 8/1994 |
| EP | 0 516 708 B1 | 12/1994 |
| EP | 0 631 072 A1 | 12/1994 |
| EP | 0 596 196 A3 | 6/1995 |
| EP | 0 736 711 A1 | 10/1996 |
| EP | 0 744 567 A1 | 11/1996 |
| EP | 0 789 152 A2 | 8/1997 |
| EP | 0 798 498 A1 | 10/1997 |
| EP | 0 814 288 A1 | 12/1997 |
| EP | 0 789 152 A3 | 4/1998 |
| EP | 0 843 114 A2 | 5/1998 |
| EP | 0 846 900 A1 | 6/1998 |
| EP | 0 864 770 A1 | 9/1998 |
| EP | 0 913 605 A2 | 5/1999 |
| EP | 0 921 334 A1 | 6/1999 |
| EP | 0 843 114 A3 | 7/1999 |
| EP | 0 940 609 A2 | 9/1999 |
| EP | 0 945 656 A2 | 9/1999 |
| EP | 0 670 976 B1 | 11/1999 |
| EP | 0 913 605 A3 | 5/2000 |
| EP | 0 999 364 A2 | 5/2000 |
| EP | 0 999 388 A1 | 5/2000 |
| EP | 1 016 800 A2 | 7/2000 |
| EP | 0 945 656 A3 | 8/2000 |
| EP | 1 024 318 A2 | 8/2000 |
| EP | 1 050 700 A2 | 11/2000 |
| EP | 1 055 849 A2 | 11/2000 |
| EP | 0 999 364 A3 | 2/2001 |
| EP | 1 016 800 A3 | 2/2001 |
| EP | 1 024 318 A3 | 4/2001 |
| EP | 1 096 184 A2 | 5/2001 |
| EP | 1 106 878 A2 | 6/2001 |
| EP | 1 050 700 A3 | 11/2001 |
| EP | 1 164 319 A2 | 12/2001 |
| EP | 1 182 133 A1 | 2/2002 |
| EP | 1 106 878 A3 | 3/2002 |
| EP | 1 055 849 A3 | 4/2002 |
| EP | 1 201 975 A2 | 5/2002 |
| EP | 1 231 418 A2 | 8/2002 |
| EP | 1 245 874 A2 | 10/2002 |
| JP | 54-132050 | 10/1979 |
| JP | 54-158556 | 12/1979 |
| JP | 55-082857 | 6/1980 |
| JP | 56-105157 | 8/1981 |
| JP | 56-138566 | 10/1981 |
| JP | 59-126162 | 7/1984 |
| JP | 59-126164 | 7/1984 |
| JP | 60-139970 | 7/1985 |
| JP | 60-245874 | 12/1985 |
| JP | 62-037571 | 2/1987 |
| JP | 62-258266 | 11/1987 |
| JP | 63-071583 | 3/1988 |
| JP | 63-239314 | 10/1988 |
| JP | 2-102974 | 4/1990 |
| JP | 03-010993 | 1/1991 |
| JP | 03-020175 | 1/1991 |
| JP | 03020175 A | 1/1991 |
| JP | 03-260478 | 11/1991 |
| JP | 03-265765 | 11/1991 |

| | | | | | | |
|---|---|---|---|---|---|---|
| JP | 03260478 A | 11/1991 | | JP | 2001-050287 | 2/2001 |
| JP | 04-203658 | 7/1992 | | JP | 2001-065703 | 3/2001 |
| JP | 05-223174 | 8/1993 | | JP | 2001-074143 | 3/2001 |
| JP | 06-201054 | 7/1994 | | JP | 2001074143 A | 3/2001 |
| JP | 06-300141 | 10/1994 | | JP | 2001-124214 | 5/2001 |
| JP | 07-042848 | 2/1995 | | JP | 2001-125374 | 5/2001 |
| JP | 07-071612 | 3/1995 | | JP | 2001-183955 | 7/2001 |
| JP | 07-174238 | 7/1995 | | JP | 2001-263500 | 9/2001 |
| JP | 07-291186 | 11/1995 | | JP | 2001263500 A | 9/2001 |
| JP | 07-332377 | 12/1995 | | JP | 2001-317635 | 11/2001 |
| JP | 08-004776 | 1/1996 | | JP | 2001-329984 | 11/2001 |
| JP | 08-190268 | 7/1996 | | JP | 2001317635 A | 11/2001 |
| JP | 08-254213 | 10/1996 | | JP | 2001329984 A | 11/2001 |
| JP | 08-296743 | 11/1996 | | JP | 2001-349442 | 12/2001 |
| JP | 08-338534 | 12/1996 | | JP | 2001-355645 | 12/2001 |
| JP | 08338534 A | 12/1996 | | JP | 2002-048147 | 2/2002 |
| JP | 09-088886 | 3/1997 | | JP | 2002-048246 | 2/2002 |
| JP | 09-268981 | 10/1997 | | JP | 2002-115667 | 4/2002 |
| JP | 10-003212 | 1/1998 | | JP | 2002-115668 | 4/2002 |
| JP | 10-009401 | 1/1998 | | JP | 2002-115762 | 4/2002 |
| JP | 10-169787 | 6/1998 | | JP | 2002-122086 | 4/2002 |
| JP | 10-220590 | 8/1998 | | JP | 2002-122087 | 4/2002 |
| JP | 10-331984 | 12/1998 | | JP | 2002122087 A | 4/2002 |
| JP | 11-013893 | 1/1999 | | JP | 2002-130306 | 5/2002 |
| JP | 11-173239 | 6/1999 | | JP | 2002-139058 | 5/2002 |
| JP | 11-210684 | 8/1999 | | JP | 2002-206549 | 7/2002 |
| JP | 11-218095 | 8/1999 | | JP | 2002-228008 | 8/2002 |
| JP | 11-223198 | 8/1999 | | JP | 2002-228009 A | 8/2002 |
| JP | 11223198 A | 8/1999 | | JP | 2002228009 A | 8/2002 |
| JP | 11-248004 | 9/1999 | | JP | 2002-276816 | 9/2002 |
| JP | 11-344128 | 12/1999 | | JP | 2002276816 A | 9/2002 |
| JP | 2000-065217 | 3/2000 | | WO | WO 85/03558 | 8/1985 |
| JP | 2000-193096 | 7/2000 | | WO | WO 01/90610 A1 | 11/2001 |
| JP | 2000-297757 | 10/2000 | | | | |
| JP | 2000-346203 | 12/2000 | | | * cited by examiner | |

SEAL FOR A SHAFT

PRIORITY

This application is a continuation of, clams priority to, and entirely incorporates U.S. Pat. No. 6,692,007, which was filed Oct. 31, 2001 as U.S. patent application Ser. No. 09/999,654, issued Feb. 17, 2004, and entitled Improved Seal For A Shaft.

TECHNICAL FIELD

Generally, the present disclosure is related to the field of seals for sealing rotary shafts. The methods and apparatus are particularly related to the field of unitary combination lip and sleeve seals. More specifically, the present invention relates to an improved seal adapted for use in severe duty applications where oil and grease must be held in contact with rotary shaft and bearing assemblies. The present invention incorporates design features that prevent the seal from wearing or cutting a groove into the associated rotary shaft, which can occur with other seals during normal operation.

BACKGROUND

Figure 1:
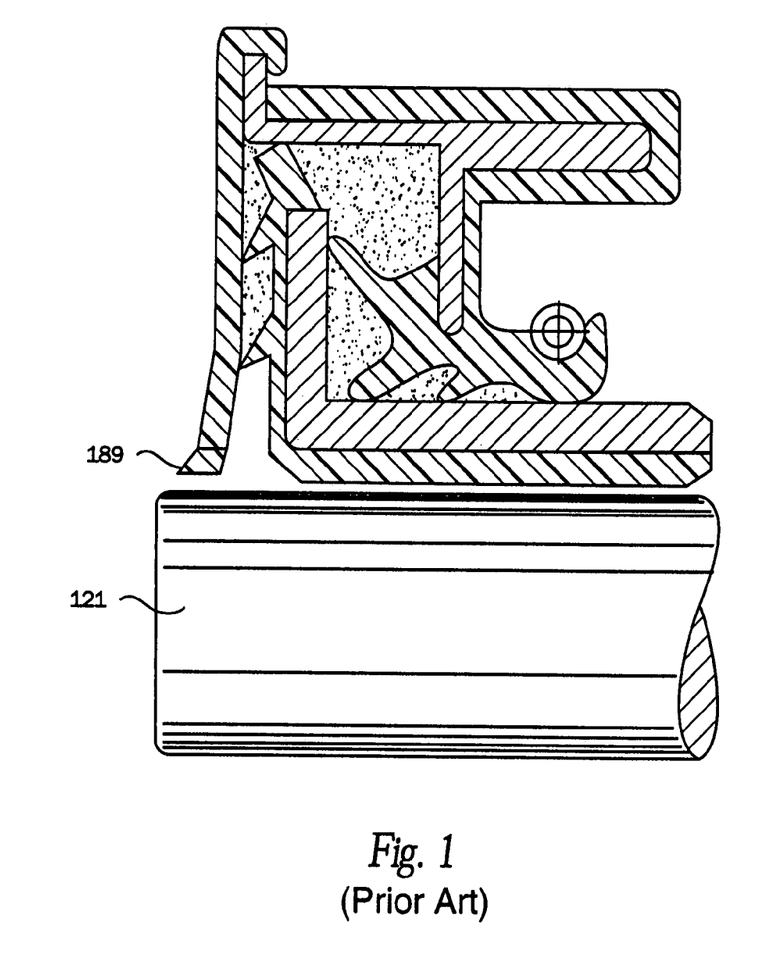
FIG. 1 shows a cross-sectional profile of the structure of an embodiment of a prior art seal, in which the wiper ring directly contacts the rotary shaft.

The present seal structure yields a very important benefit over prior seal systems, in addition to providing most of the benefits of these seals. Previous seals, an example of which is shown in FIG. 1, have a tendency to cut or wear a circular groove into the associated rotary shaft. Theses grooves are primarily caused by the frictional contact between the faceplate wiper ring 189 and the shaft 121, as the shaft is rotated during normal operation of the machine. It is undesirable to have the wiper ring cutting a groove into the rotary shaft during operation because these grooves weaken the shaft and can eventually lead to cracking of the spindle. It is equally undesirable to remove the wiper ring from the seal faceplate, because the wiper ring provides an initial barrier against environmental contaminants. Therefore, the present invention alleviates the tendency of the wiper ring to cut or groove the rotary shaft, without compromising the overall seal quality.

These and further objects of the apparatus taught in accordance with this specification, the claims, and the appended drawing figures are set forth below.

SUMMARY

The present disclosure, which incorporates herein by reference in their entirety, U.S. Pat. No. 6,186,507 to Oldenburg and application Ser. No. 09/401,570, filed Sep. 22, 1999, to Oldenburg, shows a retrofittable radial lip seal adapted to fit coaxially around, and reduce wear to, a circular rotatable shaft. In one embodiment, the seal comprises a first sleeve, a cylindrical seal case, a faceplate, a second sleeve and a flexible member. The first sleeve has an inner end that would normally be in contact with the grease, oil, or other fluid to be contained within a housing, an outer end opposite the inner end, a bore that has an elastomeric coating, and a first sleeve flange extending radially outward from the outer end of the first sleeve and generally perpendicular to the first sleeve axis. The first sleeve flange is terminated with an outer edge.

A cylindrically hollow seal case adapted for fitting into a bore is disposed coaxially around the first sleeve. The case is formed from a generally cylindrical case body having an outside surface, or outside diameter, that may be disposed in a bore and in contact with the wall of the bore. An elasotmeric coating may be affixed to the outside of the case body. By coating the outside of the metal case body with an elastomeric coating or layer, it is possible for the seal to securely fit a bore that may be worn or slightly damaged through use.

A case flange extends radially inwardly from, and generally perpendicular to, the longitudinal axis of the inside of the case. It is believed preferable to draw the case flange from the material of the case body. When formed in that manner, the material of the case body is doubled back on itself to yield two thicknesses of the case material for the distance between the case inner end and the case flange.

A generally planar circular faceplate has an inside surface, an outside surface, and a central aperture slightly larger than the outside diameter of the first sleeve. The plane of the inner faceplate surface is disposed generally parallel to the case skirt and the face of the first and second sleeve flanges. An elastomeric faceplate wiper ring, having at least one and preferably two main elastomeric excluding lips, can be attached to the faceplate at the central aperture so that the lips contact the outer surface of the second sleeve. The faceplate wiper ring has the ability to exclude contaminants from the remainder of the seal by contacting the second sleeve. In addition, the second sleeve and second sleeve elastomeric coating prevent the faceplate wiper ring from directly contacting the rotary shaft, and thereby prevent the wiper ring from wearing a groove into the rotary shaft during operation of the machine.

A second sleeve is located adjacent to the first sleeve and is adapted to fit coaxially around the shaft. The second sleeve has an outer end that is exposed to ambient conditions, an inner end adjacent to the outer end of the first sleeve, a bore that has an elastomeric coating, and a second sleeve flange that extends radially outward from the inner end of the second sleeve and runs generally perpendicular to the second sleeve axis. A circular elastomeric perimeter lip extends radially outwardly from the inner edge of the second sleeve flange to contact a generally cylindrical hollow seal case.

In another embodiment, the first sleeve and the second sleeve are replaced by one continuous sleeve that is adapted to fit coaxially around a shaft. In this embodiment, the seal comprises a continuous sleeve, a cylindrical seal case, a faceplate and a flexible member. The continuous sleeve has an inner end that extends into the sealed region and outer end that contacts the environment excluded by the seal. The continuous sleeve is operably positioned between the faceplate and the rotary shaft, thus preventing the wiper ring excluder lips from contacting the shaft.

In one embodiment, the seal is made into a unitary structure by inserting the first sleeve inner end through the case flange so that the first sleeve flange is positioned near the bumper. The second sleeve is then placed inside the seal case so that the perimeter lip of the second sleeve flange contacts the inside surface of the seal case outer end near the case skirt. All of the voids between the case inner flange and the case skirt can be packed with grease before final assembly of the seal. The faceplate is then attached to the case skirt thereby retaining the sleeves within the case portion. It has been found that a high quality water-resistant grease works well. One satisfactory grease is made by Esso Corporation and sold under the trade name "BEACON 325," although other products may also serve quite satisfactorily. Although it is believed preferable to attach the faceplate to the case by crimping the peripheral edge of the faceplate around the outer edge of the case skirt, the faceplate may also be attached to the skirt by welding, brazing, adhesive bonding, or by any other of the usual means of connecting such items. It is desired that the junction between the case skirt and the faceplate be impervious to external contaminants and internal lubricants at the temperatures, pressures and other conditions in which the seal was operated.

DETAILED DESCRIPTION

Figure 2:
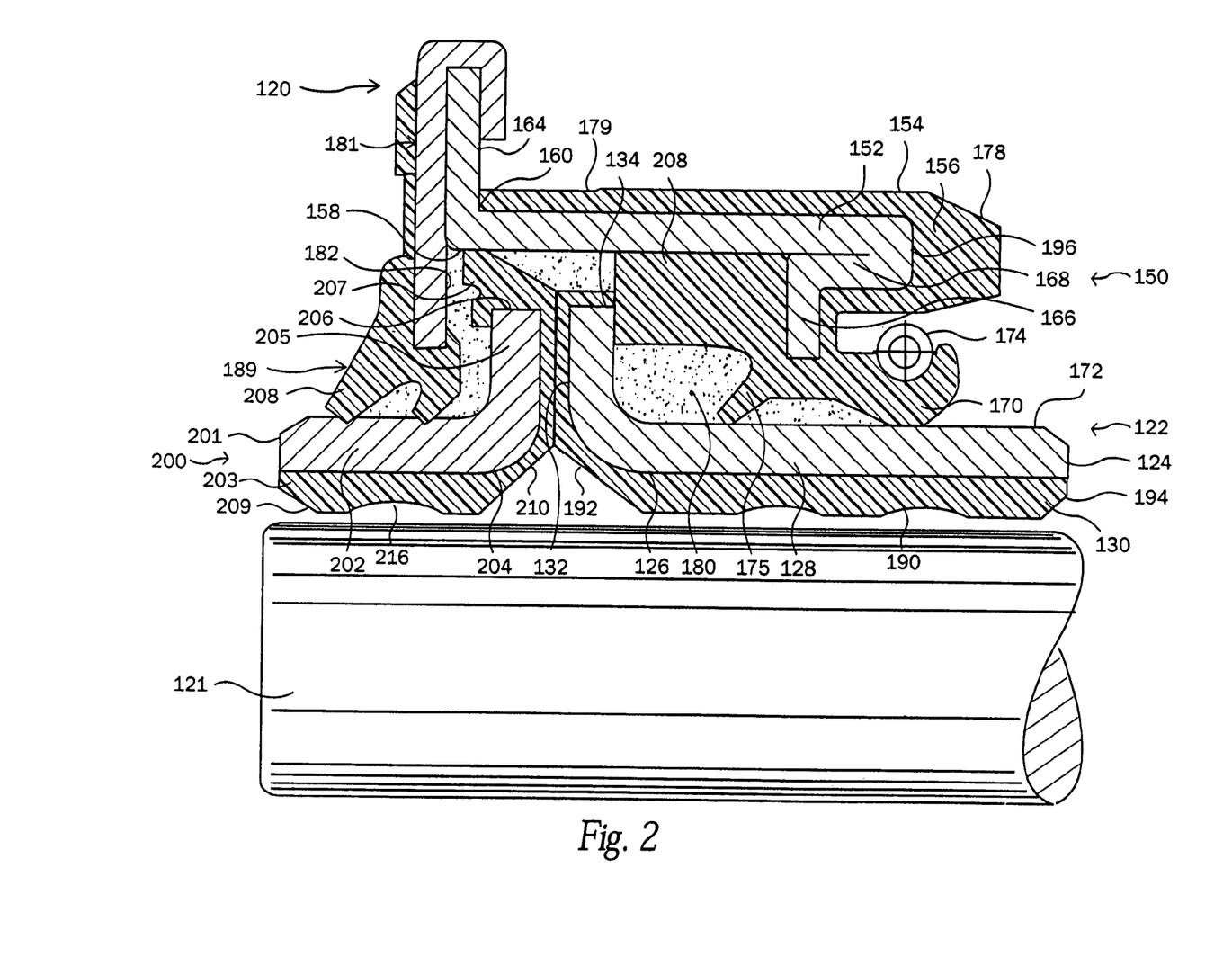
FIG. 2 shows a cross-sectional profile of the structure of an embodiment of the present invention.

Referring now to the various figures of the accompanying drawing, FIG. 2 depicts a cross-sectional profile of an embodiment of the seal 120. A first sleeve, or seal sleeve, 122 is adapted to fit coaxially around a shaft 121. The first sleeve 122 has an inner end 124 that extends into the sealed region, which normally contains oil or grease, and an outer end 126 opposite. The first sleeve bore 128 may be coated with an elastomeric coating 130 in the region between the first sleeve inner end 124 and the first sleeve outer end 126. The optional sleeve bore elastomeric coating is desirable because it may prevent leakage from between the seal 120 and the shaft 121 even when the shaft is worn or damaged. The first sleeve flange 132 extends radially outwardly from the first sleeve outer end 126. The first sleeve flange 132 is adjacent, and runs generally parallel to, the second sleeve flange 205 which is described below.

A seal case 150 is disposed coaxially around the outside of the first sleeve 122. The seal case 150 has a cylindrical case body 152 designed so that the case outside surface 154 can fit into and seal against a bore in a housing or flange through which the shaft 121 to be sealed extends. It is advantageous to coat the case outside surface 154 with an elastomeric coating 156. The optional elastomeric coating 156 helps prevent the seal 120 from leaking when installed in a damaged bore. The case body 152 has a smoothly finished perimeter lip-contacting case inner surface 158 in the region near the case outer end 160. The case inner end 162 is axially opposite the case outer end 160 and the case skirt 164 extends radially outwardly from the case outer end 160.

A case flange 166 extends radially inwardly from the case body 152 towards the first sleeve 122. The case inner flange 166 has a circular central aperture through which the shaft 121 and first sleeve 122 fit. It is preferred to form the case flange 166 from the case body in order to create a case reinforcement 168 with a double layer of material from which the case body 152 is made.

Figure 3:
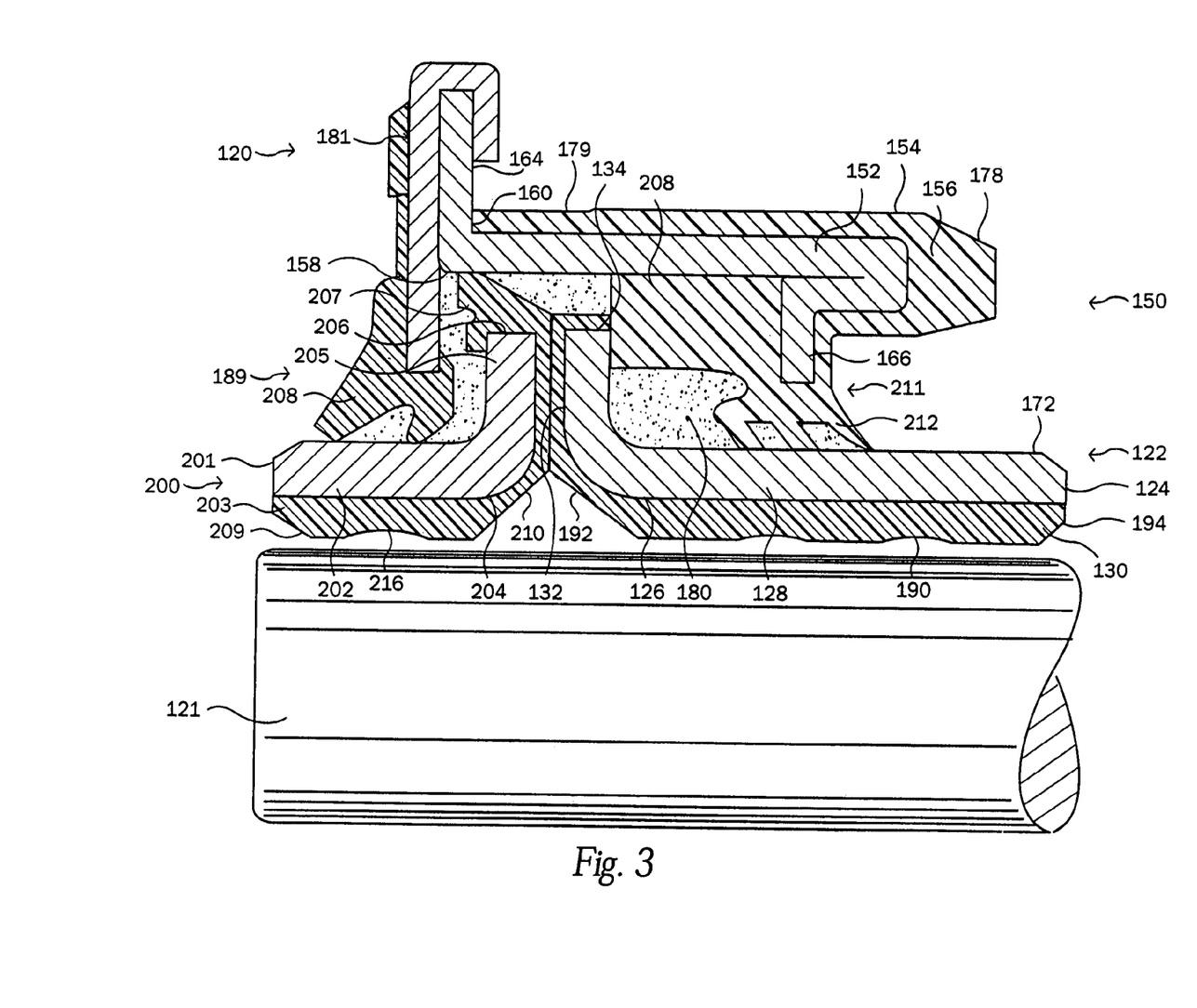
FIG. 3 shows a cross-sectional profile of the structure of another embodiment of the present invention having a triple lip sealing lip.

The main sealing lip 170 is attached to the case flange 166 and extends both axially and radially inwardly from the case flange 166. The main sealing lip 170 contacts the first sleeve outer surface 172 to form a primary sealing element by which the contents (generally fluids) of the sealed volume are prevented from transferring to the outside of the assembly. The main sealing lip 170 is optionally biased against the first sleeve outer surface 172 by a garter spring 174. The first sleeve outer surface 172 may be polished or otherwise finished to reduce wear of the main sealing lip 170. FIG. 3 shows another embodiment of the present invention where the main sealing lip 170 has been replaced with a triple lip sealing lip 211. In this alternate embodiment, each lip 212 of the triple lip sealing lip 211 extends axially and radially inward from the case flange 166 to contact the first sleeve outer surface 172.

In one embodiment, a bumper 208 extends coaxially along, and radially inwardly from, the seal case 150 from the case flange 166 to contact the first sleeve flange 132. The bumper 208 prevents the first sleeve flange 132, and consequently the first sleeve 122, from moving out of the desired position.

In one embodiment, a dust lip 175 extends axially outward from the main sealing lip and contacts the first sleeve outer surface 172. Other embodiments of the present invention may contain several dust lips, all contacting either the first sleeve outer surface 172 or the first sleeve flange 132. The case elasotmeric coating 156, the main sealing lip 170, the bumper 208 and the dust lip 175 may be integrally formed and bonded to the case body 152 and case flange 166 in a single injection molding operation.

A second sleeve, or face sleeve, 200 is adapted to fit coaxially around the shaft 121 and is adjacent the outer end of the first sleeve 122. The second sleeve outer end 201 extends out into the environment excluded by the seal. The second sleeve bore 202 may be coated with an elastomeric coating 203 in the region between the second sleeve outer end 201 and the second sleeve inner end 204. The second sleeve flange 205 extends radially outwardly from the second sleeve inner end 204, and runs generally parallel to the first sleeve flange 132. The second sleeve flange 205 has a second sleeve flange inner edge 206 from which a perimeter lip 207 extends radially outwardly towards the seal case outer end 160. In other embodiments, the perimeter lip 207 may be located on the first sleeve flange outer edge 134. The perimeter lip 207 contacts the seal case 150 near the seal case outer end 160. The face sleeve bore elastomeric coating 203 and the perimeter lip 207 may be formed and attached to the second sleeve 200 in a single injection molding operation.

On the inner end of the case body 152, the case elastomeric coating 156 is finished with a case elastomeric coating chamfer 178 to make it easier to install the seal 120 without distortion or damage. A case outside relief channel 179 may be formed in the case elastomeric coating 156 adjacent to the case skirt 164. The relief channel 179 relieves axial shear stresses from the case elastomeric coating 156 that can result when the seal 120 is installed into a bore.

A first sleeve radial channel 190 is preferably formed within the first sleeve bore elastomeric coating 130 to relieve shear as the first sleeve is fitted to a shaft. A second sleeve radial channel 216 is preferably formed within the second sleeve bore elastomeric coating 203 to relieve shear as the second sleeve is fitted to a shaft. The first sleeve 122 is finished with a sleeve outer end chamfer 192 and a sleeve inner end chamfer 194 to reduce the potential for tearing of the sleeve bore elastomeric coating 130 and for distortion of the first sleeve 122 during installation of the seal 120. Similarly, the second sleeve 200 is finished with a second sleeve outer end chamfer 209 and a second sleeve inner end chamfer 210. In addition, the seal case 150 may be fitted with a case inner end chamfer 196 to reduce damage to the case elastomeric coating 156 when the case is fitted with elastomeric coating and to prevent case distortion in embodiments without case elastomeric coating 156.

The four main sub assemblies, the first sleeve 122, the seal case 150, the second sleeve 200, and the faceplate 181 are interconnected to form a complete seal 120. These four subassemblies are generally made of steel or another metal that is shaped, worked, and polished using conventional metalworking techniques and commercially available equipment. Although, any material suitable for fulfilling the functions of the seal may be used.

In one embodiment, final assembly of the seal 120 is accomplished by four additional steps. First, the first sleeve 122 is inserted into the seal case 150 so that the first sleeve flange 132 is positioned near the bumper 208. Second, the second sleeve 200 is inserted into the seal case 150 so that the perimeter lip 207 contacts the seal case outer end 160 in the region near the case skirt 164. Third, water resistant grease 180 is packed into all of the voids between the case flange 166 and the perimeter lip 207. Fourth, the faceplate 181 is attached to the case skirt 164 by crimping or other means to complete the seal assembly and unitizing process.

After the faceplate 181 is attached to the case skirt 164, the elastomeric faceplate wiper ring 189 is attached so that the wiper ring excluder lips 208 contact the face sleeve 200. The face sleeve 200 prevents the wiper ring excluder lips 208 from directly contacting the shaft 121, which alleviates the tendency of the wiper ring 189 to wear grooves into the shaft 121 during normal operation of the machine. The faceplate includes a central aperture larger than the outside diameter of the first sleeve, with the plane of the faceplate inner side 182 being oriented generally parallel to the case skirt 164 and the second sleeve flange 205.

Figure 4:
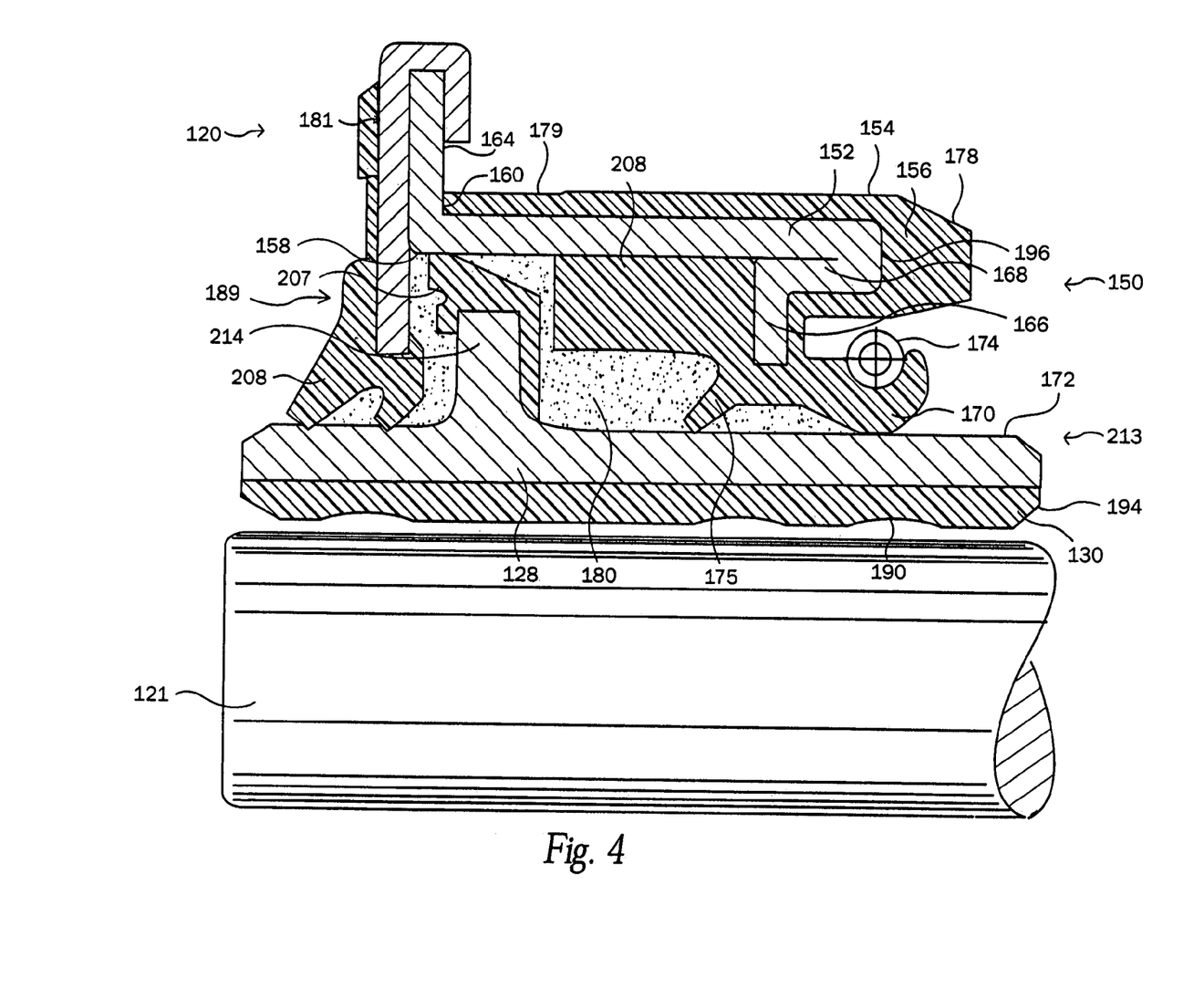
FIG. 4 shows a cross-sectional profile of the structure of another embodiment of the present invention having one continuous sleeve.

FIG. 4 shows an alternative embodiment of the seal 120 where the first sleeve 122 and the second sleeve 200 have been replaced by one continuous sleeve 213. The continuous sleeve 213 has a continuous sleeve flange 214 that extends radially outwardly from, and generally perpendicular to, the continuous sleeve 213.

Figure 5:
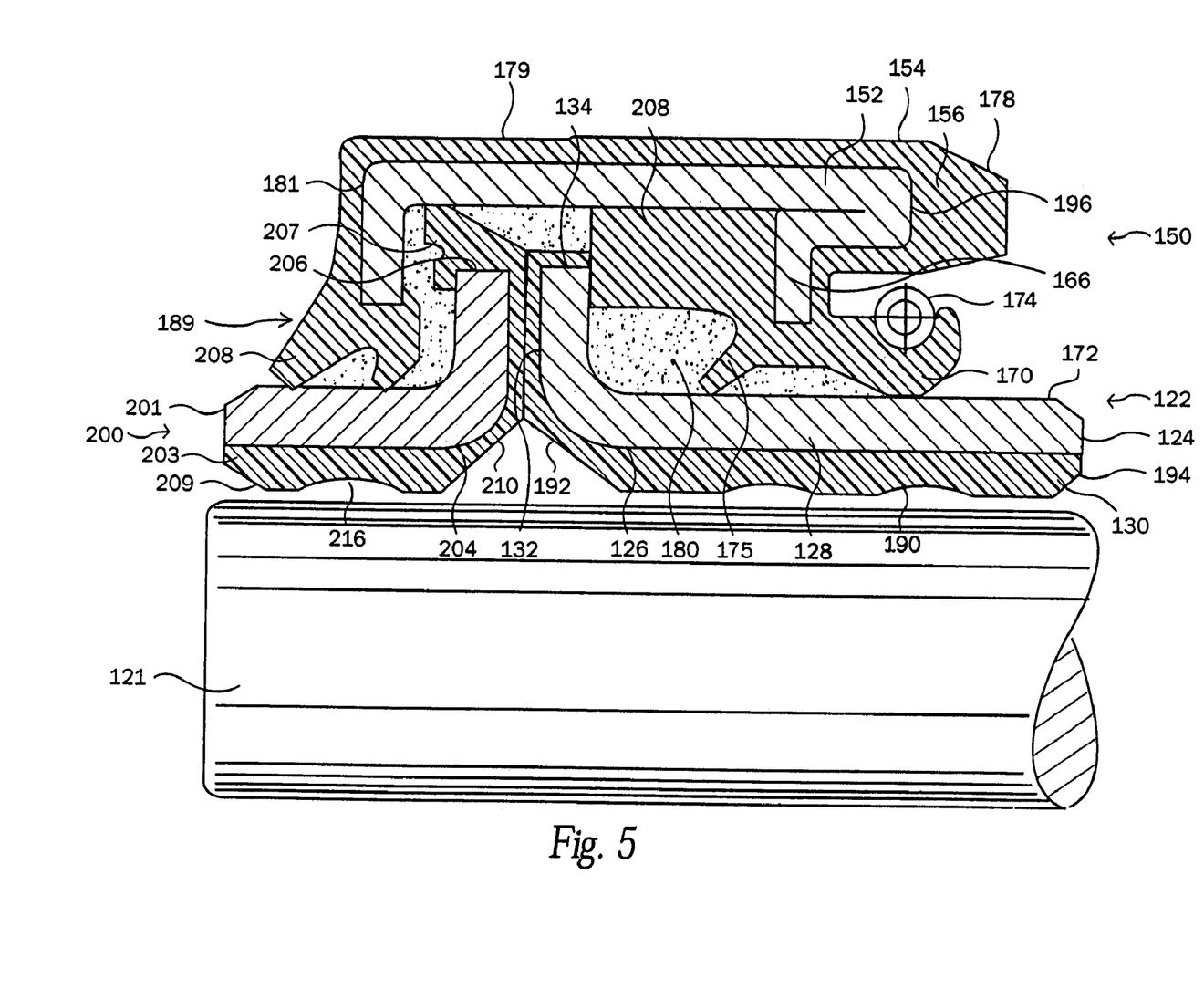
FIG. 5 shows a cross-sectional profile of the structure of another embodiment of the present invention having an externally flangeless seal case.

FIG. 5 shows and alternative embodiment of the seal 120 where the seal case 150 is formed without an external flange.

While multiple embodiments are disclosed, still other embodiments of the present invention will become apparent to those skilled in the art from the above detailed description, wherein is shown and described only the embodiments of the invention, by way of illustration, of the best modes contemplated for carrying out the invention. As will be realized, the invention is capable of modifications in various obvious aspects, all without departing from the scope of the present invention. Accordingly, the drawings and detailed description are to be regarded as illustrative in nature and not restrictive.

Any references in the above detailed description to front and back, inner and outer, inside and outside, and upper and lower are intended for convenience of description, not to limit the present invention or its components to any one positional or spacial orientation.

I claim:

1. A seal for sealing a rotary shaft, the seal comprising:
   a sleeve adapted to be disposed generally coaxially around the shaft and comprising:
   a flange sleeve portion extending generally radially outward from the sleeve;
   an outward sleeve portion generally parallel to the longitudinal axis of the shaft and extending generally axially outward from the flange sleeve portion, said outward sleeve portion including an endpoint defining an axially outermost point disposed in a first direction relative to said flange sleeve portion, and
   an inward sleeve portion generally parallel to the longitudinal axis of the shaft and extending generally axially inward from the flange sleeve portion, said inward sleeve portion including an endpoint defining an axially innermost point disposed in a second direction relative to said flange sleeve portion opposite said first direction; and
   an outer housing configured to generally surround the flange sleeve portion and at least a part of the outward and inward sleeve portions, the outer housing comprising
   a flange housing portion extending generally radially inward from the outer housing and positioned axially inward relative to the flange sleeve portion,
   a parallel housing portion generally parallel to the longitudinal axis of the shaft, and
   a faceplate portion extending generally radially inward from the outer housing and positioned axially outward relative to the flange sleeve portion; and
   an elastomeric lip extending generally between the faceplate portion and the outward sleeve portion, wherein the elastomeric lip comprises a base secured to the faceplate portion and an end displaceably abutting against the outward sleeve portion.

2. The seal of claim 1, wherein the end of the elastomeric lip is oriented generally radially inward.

3. The seal of claim 1, wherein the end of the elastomeric lip is oriented generally axially outward.

4. The seal of claim 1, wherein the end of the elastomeric lip is oriented generally both axially outward and radially inward.

5. The seal of claim 1, further comprising a second elastomeric lip that includes a base secured to the faceplate portion and an end displaceably abutting against the outward sleeve portion.

6. The seal of claim 5, wherein the ends of the elastomeric lips are oriented generally radially inward.

7. A seal for sealing a rotary shaft, the seal comprising:
   a sleeve adapted to be disposed generally coaxially around the shaft and comprising:
   a flange sleeve portion extending generally radially outward from the sleeve;
   an outward sleeve portion generally parallel to the longitudinal axis of the shaft and extending generally axially outward from the flange sleeve portion, said outward sleeve portion including an endpoint defining an axially outermost point disposed in a first direction relative to said flange sleeve portion, and
   an inward sleeve portion generally parallel to the longitudinal axis of the shaft and extending generally axially inward from the flange sleeve portion, said inward sleeve portion including an endpoint defining an axially innermost point disposed in a second direction relative to said flange sleeve portion opposite said first direction; and
   an outer housing configured to generally surround the flange sleeve portion and at least a part of the outward and inward sleeve portions, the outer housing comprising
   a flange housing portion extending generally radially inward from the outer housing and positioned axially inward relative to the flange sleeve portion,
   a parallel housing portion generally parallel to the longitudinal axis of the shaft, and a faceplate portion extending generally radially inward from the outer housing and positioned axially outward relative to the flange sleeve portion;

an elastomeric lip extending generally between the faceplate portion and the outward sleeve portion; and wherein the faceplate portion comprises a parallel portion that is generally parallel to the longitudinal axis of the shaft.

8. The seal of claim 7, wherein the faceplate portion further comprises a portion generally parallel to the faceplate portion and extending radially from the parallel portion of the faceplate.

9. A seal for sealing a rotary shaft, the seal comprising:
a sleeve adapted to be disposed generally coaxially around the shaft and comprising:
a flange sleeve portion extending generally radially outward from the sleeve;
an outward sleeve portion generally parallel to the longitudinal axis of the shaft and extending generally axially outward from the flange sleeve portion, said outward sleeve portion including an endpoint defining an axially outermost point disposed in a first direction relative to said flange sleeve portion, and
an inward sleeve portion generally parallel to the longitudinal axis of the shaft and extending generally axially inward from the flange sleeve portion, said inward sleeve portion including an endpoint defining an axially innermost point disposed in a second direction relative to said flange sleeve portion opposite said first direction; and
an outer housing configured to generally surround the flange sleeve portion and at least a part of the outward and inward sleeve portions, the outer housing comprising
a flange housing portion extending generally radially inward from the outer housing and positioned axially inward relative to the flange sleeve portion,
a parallel housing portion generally parallel to the longitudinal axis of the shaft, and
a faceplate portion extending generally radially inward from the outer housing and positioned axially outward relative to the flange sleeve portion;
an elastomeric lip extending generally between the faceplate portion and the outward sleeve portion; and
a second elastomeric lip extending generally between the flange sleeve portion and the outer housing.

10. The seal of claim 9, wherein the second elastomeric lip comprises a base secured to the flange sleeve portion and an end displaceably abutting against the outer housing.

11. A seal for sealing a rotary shaft, the seal comprising:
a sleeve adapted to be disposed generally coaxially around the shaft and comprising:
a flange sleeve portion extending generally radially outward from the sleeve;
an outward sleeve portion generally parallel to the longitudinal axis of the shaft and extending generally axially outward from the flange sleeve portion, said outward sleeve portion including an endpoint defining an axially outermost point disposed in a first direction relative to said flange sleeve portion, and
an inward sleeve portion generally parallel to the longitudinal axis of the shaft and extending generally axially inward from the flange sleeve portion, said inward sleeve portion including an endpoint defining an axially innermost point disposed in a second direction relative to said flange sleeve portion opposite said first direction; and
an outer housing configured to generally surround the flange sleeve portion and at least a part of the outward and inward sleeve portions, the outer housing comprising
a flange housing portion extending generally radially inward from the outer housing and positioned axially inward relative to the flange sleeve portion,
a parallel housing portion generally parallel to the longitudinal axis of the shaft, and
a faceplate portion extending generally radially inward from the outer housing and positioned axially outward relative to the flange sleeve portion;
an elastomeric lip extending generally between the faceplate portion and the outward sleeve portion; and
a second elastomeric lip that includes a base secured to the flange housing portion and an end displaceably abutting against the sleeve.

12. The seal of claim 11, further comprising a garter spring associated with the second elastomeric lip, which is a main sealing lip.

13. The seal of claim 11, further comprising a third elastomeric lip that includes a base secured to the flange housing portion and an end displaceably abutting against the sleeve.

14. The seal of claim 13, further comprising a fourth elastomeric lip that includes a base secured to the flange housing portion and an end displaceably abutting against the sleeve.

15. The seal of claim 14, further comprising a fifth elastomeric lip that includes a base secured to the flange housing portion and an end displaceably abutting against the sleeve.

16. The seal of claim 13, further comprising an elastomeric bumper attached to the housing portion and abutting against the flange sleeve portion.

17. The seal of claim 11, further comprising third and fourth elastomeric lips that each include a base secured to the flange housing portion and an end displaceably abutting against the sleeve, wherein the second, third and fourth elastomeric tips are all oriented generally axially inward.

18. The seal of claim 17, further comprising an elastomeric bumper attached to the outer housing and abutting against the flange sleeve portion.

19. A seal for sealing a rotary shaft, the seal comprising:
a sleeve adapted to be disposed generally coaxially around the shaft and comprising:
a flange sleeve portion extending generally radially outward from the sleeve;
an outward sleeve portion generally parallel to the longitudinal axis of the shaft and extending generally axially outward from the flange sleeve portion, said outward sleeve portion including an endpoint defining an axially outermost point disposed in a first direction relative to said flange sleeve portion, and
an inward sleeve portion generally parallel to the longitudinal axis of the shaft and extending generally axially inward from the flange sleeve portion, said inward sleeve portion including an endpoint defining an axially innermost point disposed in a second direction relative to said flange sleeve portion opposite said first direction; and
an outer housing configured to generally surround the flange sleeve portion and at least a part of the outward and inward sleeve portions, the outer housing comprising a flange housing portion extending generally radially inward from the outer housing and positioned axially inward relative to the flange sleeve portion, a parallel housing portion generally parallel to the longitudinal axis of the shaft, and a faceplate portion extending generally radially inward from the outer housing and positioned axially outward relative to the flange sleeve portion;

wherein the sleeve is formed from at least two pieces, the first piece comprising the outward sleeve portion and the second piece comprising the inward sleeve portion.

20. The seal of claim 19, wherein the flange sleeve portion comprises a flange that extends generally radially outward from the outward sleeve portion.

21. The seal of claim 19, wherein the flange sleeve portion comprises a flange that extends generally radially outward from the inward sleeve portion.

22. The seal of claim 19, wherein the flange sleeve portion comprises two flanges, one extending generally radially outward from the inward sleeve portion and the other extending generally radially outward from the outward sleeve portion.

23. A seal for sealing a rotary shaft, the seal comprising:
a sleeve adapted to be disposed generally coaxially around the shaft and comprising:
a flange sleeve portion extending generally radially outward from the sleeve;
an outward sleeve portion generally parallel to the longitudinal axis of the shaft and extending generally axially outward from the flange sleeve portion, said outward sleeve portion including an endpoint defining an axially outermost point disposed in a first direction relative to said flange sleeve portion, and
an inward sleeve portion generally parallel to the longitudinal axis of the shaft and extending generally axially inward from the flange sleeve portion, said inward sleeve portion including an endpoint defining an axially innermost point disposed in a second direction relative to said flange sleeve portion opposite said first direction; and
an outer housing configured to generally surround the flange sleeve portion and at least a part of the outward and inward sleeve portions, the outer housing comprising
a flange housing portion extending generally radially inward from the outer housing and positioned axially inward relative to the flange sleeve portion,
a parallel housing portion generally parallel to the longitudinal axis of the shaft, and
a faceplate portion extending generally radially inward from the outer housing and positioned axially outward relative to the flange sleeve portion; and
an elastomeric lip extending generally between the flange sleeve portion and the outer housing.

24. The seal of claim 23, wherein the elastomeric lip comprises a base secured to the flange sleeve portion and an end displaceably abutting against the outer housing.

25. The seal of claim 24, wherein the end of the elastomeric lip is oriented generally radially outward.

26. The seal of claim 24, wherein the end of the elastomeric lip is oriented generally axially outward.

27. The seal of claim 24, wherein the end of the elastomeric lip is oriented generally both axially and radially outward.

28. The seal of claim 23, further comprising an elastomeric coating on at least a portion of the sleeve in a region between the sleeve and the shaft.

29. The seal of claim 28, wherein the elastomeric coating extends into at least a portion of a region between the outward and inward sleeve portions.

30. The seal of claim 28, wherein the elastomeric coating has a radial channel.

31. The seal of claim 23, further comprising a second elastomeric lip extending generally between the faceplate portion and the sleeve.

32. The seal of claim 31, wherein the second elastomeric lip comprises a base secured to the faceplate portion and an end displaceably abutting against the outward sleeve portion.

33. The seal of claim 23, further comprising a second elastomeric lip that includes a base secured to the flange housing portion and an end displaceably abutting against the sleeve.

34. The seal of claim 33, further comprising a garter spring associated with the second elastomeric lip, which is a main sealing lip.

35. The seal of claim 33, further comprising a third elastomeric lip that includes a base secured to the flange housing portion and an end displaceably abutting against the sleeve.

36. The seal of claim 35, further comprising a fourth elastomeric lip that includes a base secured to the flange housing portion and an end displaceably abutting against the sleeve.

37. The seal of claim 36, further comprising a fifth elastomeric lip that includes a base secured to the flange housing portion and an end displaceably abutting against the sleeve.

38. The seal of claim 35, further comprising an elastomeric bumper attached to the housing portion and abutting against the flange sleeve portion.

39. The seal of claim 33, further comprising third and fourth elastomeric lips that each include a base secured to the flange housing portion and an end displaceably abutting against the sleeve, wherein the second, third and fourth elastomeric lips are all oriented generally axially inward.

40. The seal of claim 39, further comprising an elastomeric bumper attached to the outer housing and abutting against the sleeve.

41. The seal of claim 23, further comprising a second parallel housing portion generally parallel to the longitudinal axis of the shaft.

42. The seal of claim 41, wherein the second parallel housing portion is attached to an inward end of the first parallel housing portion.

43. A seal for sealing a rotary shaft, the seal comprising:
a sleeve adapted to be disposed generally coaxially around the shaft and comprising:
a flange sleeve portion extending generally radially outward from the sleeve;
an outward sleeve portion generally parallel to the longitudinal axis of the shaft and extending generally axially outward from the flange sleeve portion, said outward sleeve portion including an endpoint defining an axially outermost point disposed in a first direction relative to said flange sleeve portion, and
an inward sleeve portion generally parallel to the longitudinal axis of the shaft and extending generally axially inward from the flange sleeve portion, said inward sleeve portion including an endpoint defining an axially innermost point disposed in a second direction relative to said flange sleeve portion opposite said first direction; and an outer housing configured to generally surround the flange sleeve portion and at least a part of the outward and inward sleeve portions, the outer housing comprising a flange housing portion extending generally radially inward from the outer housing and positioned axially inward relative to the flange sleeve portion, a parallel housing portion generally parallel to the longitudinal axis of the shaft, and a faceplate portion extending generally radially inward from the outer housing and positioned axially outward relative to the flange sleeve portion; and further comprising an elastomeric bumper attached to the flange housing portion and abutting against the flange sleeve portion, wherein the elastomeric bumper is also attached to the parallel housing portion.

44. A seal for sealing a rotary shaft, the seal comprising:

a sleeve adapted to be disposed generally coaxially around the shaft and comprising:

a flange sleeve portion extending generally radially outward from the sleeve;

an outward sleeve portion generally parallel to the longitudinal axis of the shaft and extending generally axially outward from the flange sleeve portion, said outward sleeve portion including an endpoint defining an axially outermost point disposed in a first direction relative to said flange sleeve portion, and an inward sleeve portion generally parallel to the longitudinal axis of the shaft and extending generally axially inward from the flange sleeve portion, said inward sleeve portion including an endpoint defining an axially innermost point disposed in a second direction relative to said flange sleeve portion opposite said first direction; and an outer housing configured to generally surround the flange sleeve portion and at least a part of the outward and inward sleeve portions, the outer housing comprising a flange housing portion extending generally radially inward from the outer housing and positioned axially inward relative to the flange sleeve portion, a parallel housing portion generally parallel to the longitudinal axis of the shaft, and a faceplate portion extending generally radially inward from the outer housing and positioned axially outward relative to the flange sleeve portion;

further comprising an elastomeric bumper attached to the flange housing portion and abutting against the flange sleeve portion; and wherein the sleeve is formed from at least two pieces, the first piece comprising the outward sleeve portion and the second piece comprising the inward sleeve portion, wherein the flange sleeve portion comprises at least one flange extending generally radially outward from the outward or inward sleeve portions, wherein the bumper abuts against said flange.

45. A seal for sealing a rotary shaft, the seal comprising:

a sleeve adapted to be disposed generally coaxially around the shaft and comprising:

a flange sleeve portion extending generally radially outward from the sleeve;

an outward sleeve portion generally parallel to the longitudinal axis of the shaft and extending generally axially outward from the flange sleeve portion, said outward sleeve portion including an endpoint defining an axially outermost point disposed in a first direction relative to said flange sleeve portion, and an inward sleeve portion generally parallel to the longitudinal axis of the shaft and extending generally axially inward from the flange sleeve portion, said inward sleeve portion including an endpoint defining an axially innermost point disposed in a second direction relative to said flange sleeve portion opposite said first direction; and an outer housing configured to generally surround the flange sleeve portion and at least a part of the outward and inward sleeve portions, the outer housing comprising a flange housing portion extending generally radially inward from the outer housing and positioned axially inward relative to the flange sleeve portion, a parallel housing portion generally parallel to the longitudinal axis of the shaft, and a faceplate portion extending generally radially inward from the outer housing and positioned axially outward relative to the flange sleeve portion;

an elastomeric lip that includes a base secured to the flange housing portion and an end displaceably abutting against the inward sleeve portion;

a garter spring associated with the elastomeric lip, which is a main sealing lip;

a second elastomeric lip that includes a base secured to the flange housing portion and an end displaceably abutting against the inward sleeve portion, wherein the second elastomeric lip extends generally axially outward from the flange housing portion;

a third elastomeric lip extending generally axially outward; and further comprising a fourth elastomeric lip extending generally axially outward.

46. A seal for sealing a rotary shaft, the seal comprising:

a sleeve adapted to be disposed generally coaxially around the shaft and comprising:

a flange sleeve portion extending generally radially outward from the sleeve;

an outward sleeve portion generally parallel to the longitudinal axis of the shaft and extending generally axially outward from the flange sleeve portion, said outward sleeve portion including an endpoint defining an axially outermost point disposed in a first direction relative to said flange sleeve portion, and an inward sleeve portion generally parallel to the longitudinal axis of the shaft and extending generally axially inward from the flange sleeve portion, said inward sleeve portion including an endpoint defining an axially innermost point disposed in a second direction relative to said flange sleeve portion opposite said first direction; and an outer housing configured to generally surround the flange sleeve portion and at least a part of the outward and inward sleeve portions, the outer housing comprising a flange housing portion extending generally radially inward from the outer housing and positioned axially inward relative to the flange sleeve portion, a parallel housing portion generally parallel to the longitudinal axis of the shaft, and a faceplate portion extending generally radially inward from the outer housing and positioned axially outward relative to the flange sleeve portion;

an elastomeric lip that includes a base secured to the flange housing portion and an end displaceably abutting against the inward sleeve portion, wherein the elastomeric lip extends generally axially inward from the flange housing portion; and a second elastomeric lip that extends generally axially inward from the flange housing portion.

47. The seal of claim 46, further comprising a third elastomeric lip that extends generally inward from the flange housing portion.

48. A seal for sealing a rotary shaft, the seal comprising:
a sleeve adapted to be disposed generally coaxially around the shaft and comprising:
a flange sleeve portion extending generally radially outward from the sleeve;
an outward sleeve portion generally parallel to the longitudinal axis of the shaft and extending generally axially outward from the flange sleeve portion, said outward sleeve portion including an endpoint defining an axially outermost point disposed in a first direction relative to said flange sleeve portion, and
an inward sleeve portion generally parallel to the longitudinal axis of the shaft and extending generally axially inward from the flange sleeve portion, said inward sleeve portion including an endpoint defining an axially innermost point disposed in a second direction relative to said flange sleeve portion opposite said first direction; and
an outer housing configured to generally surround the flange sleeve portion and at least a part of the outward and inward sleeve portions, the outer housing comprising
a flange housing portion extending generally radially inward from the outer housing and positioned axially inward relative to the flange sleeve portion,
a parallel housing portion generally parallel to the longitudinal axis of the shaft, and
a faceplate portion extending generally radially inward from the outer housing and positioned axially outward relative to the flange sleeve portion;
an elastomeric lip that includes a base secured to the flange housing portion and an end displaceably abutting against the inward sleeve portion; and
wherein the outer housing further comprises a second flange housing portion extending generally radially outward from the outer housing.

49. A seal for sealing a rotary shaft, the seal comprising:
a sleeve adapted to be disposed generally coaxially around the shaft and comprising:
a flange sleeve portion extending generally radially outward from the sleeve;
an outward sleeve portion generally parallel to the longitudinal axis of the shaft and extending generally axially outward from the flange sleeve portion, said outward sleeve portion including an endpoint defining an axially outermost point disposed in a first direction relative to said flange sleeve portion, and
an inward sleeve portion generally parallel to the longitudinal axis of the shaft and extending generally axially inward from the flange sleeve portion, said inward sleeve portion including an endpoint defining an axially innermost point disposed in a second direction relative to said flange sleeve portion opposite said first direction; and
an outer housing configured to generally surround the flange sleeve portion and at least a part of the outward and inward sleeve portions, the outer housing comprising a flange housing portion extending generally radially inward from the outer housing and positioned axially inward relative to the flange sleeve portion,
a parallel housing portion generally parallel to the longitudinal axis of the shaft, and
a faceplate portion extending generally radially inward from the outer housing and positioned axially outward relative to the flange sleeve portion;
an elastomeric lip that includes a base secured to the flange housing portion and an end displaceably abutting against the inward sleeve portion; and
wherein the faceplate portion comprises a parallel portion that is generally parallel to the longitudinal axis of the shaft,
wherein the faceplate portion further comprises a portion generally parallel to the faceplate portion and extending radially from the parallel portion of the faceplate.

50. A seal for sealing a rotary shaft, the seal comprising:
a sleeve adapted to be disposed generally coaxially around the shaft and comprising:
a flange sleeve portion extending generally radially outward from the sleeve;
an outward sleeve portion generally parallel to the longitudinal axis of the shaft and extending generally axially outward from the flange sleeve portion, said outward sleeve portion including an endpoint defining an axially outermost point disposed in a first direction relative to said flange sleeve portion, and
an inward sleeve portion generally parallel to the longitudinal axis of the shaft and extending generally axially inward from the flange sleeve portion, said inward sleeve portion including an endpoint defining an axially innermost point disposed in a second direction relative to said flange sleeve portion opposite said first direction; and
an outer housing configured to generally surround the flange sleeve portion and at least a part of the outward and inward sleeve portions, the outer housing comprising
a flange housing portion extending generally radially inward from the outer housing and positioned axially inward relative to the flange sleeve portion,
a parallel housing portion generally parallel to the longitudinal axis of the shaft, and
a faceplate portion extending generally radially inward from the outer housing and positioned axially outward relative to the flange sleeve portion;
an elastomeric lip that includes a base secured to the flange housing portion and an end displaceably abutting against the inward sleeve portion; and
an elastomeric lip extending generally between the flange sleeve portion and the outer housing.

51. A seal for sealing a rotary shaft, the seal comprising:
a sleeve adapted to be disposed generally coaxially around the shaft and comprising:
a flange sleeve portion extending generally radially outward from the sleeve;
an outward sleeve portion generally parallel to the longitudinal axis of the shaft and extending generally axially outward from the flange sleeve portion, said outward sleeve portion including an endpoint defining an axially outermost point disposed in a first direction relative to said flange sleeve portion, and
an inward sleeve portion generally parallel to the longitudinal axis of the shaft and extending generally axially inward from the flange sleeve portion, said inward sleeve portion including an endpoint defining an axially innermost point disposed in a second direction relative to said flange sleeve portion opposite said first direction; and an outer housing configured to generally surround the flange sleeve portion and at least a part of the outward and inward sleeve portions, the outer housing comprising a flange housing portion extending generally radially inward from the outer housing and positioned axially inward relative to the flange sleeve portion, a parallel housing portion generally parallel to the longitudinal axis of the shaft, and a faceplate portion extending generally radially inward from the outer housing and positioned axially outward relative to the flange sleeve portion;

an elastomeric lip that includes a base secured to the flange housing portion and an end displaceably abutting against the inward sleeve portion; and an elastomeric lip extending generally between the faceplate portion and the outward sleeve portion.

* * * * *